Figure 1:
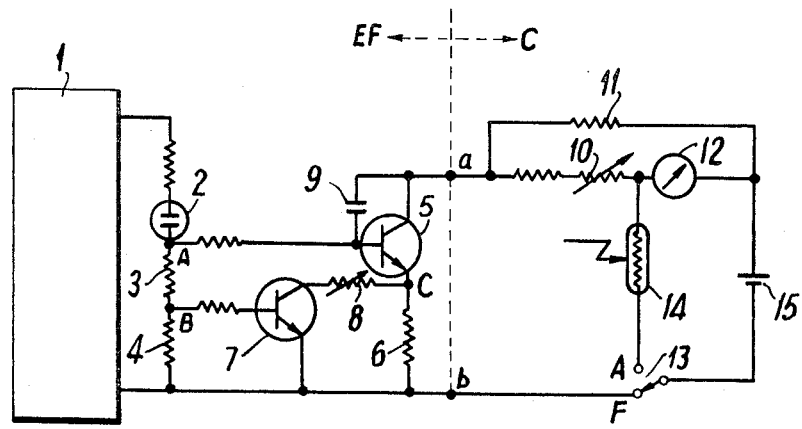

United States Patent [19]

Mashimo

[11] 3,723,810
[45] Mar. 27, 1973

[54] ELECTRONIC FLASH DEVICE

[75] Inventor: Yukio Mashimo, Tokyo, Japan

[73] Assignee: Canon Kabushiki Kaisha, Tokyo, Japan

[22] Filed: Dec. 8, 1971

[21] Appl. No.: 206,071

[30] Foreign Application Priority Data

Dec. 8, 1970  Japan..............................45/108769
Apr. 15, 1971 Japan...............................46/29205

[52] U.S. Cl.................................315/241 P, 95/11.5
[51] Int. Cl..............................................H05b 41/40
[58] Field of Search............315/241 R, 241 P, 241 S; 95/11.5

*Primary Examiner*—John Kominski
*Attorney*—Toren and McGeady

[57] ABSTRACT

An electronic flash device comprising a circuit having a first semi-conductor which functions switching action in correspondence to the charging condition of a main capacitor storing flash energy, a load connected to an emitter of said semi-conductor, and a second semi-conductor which varies output resistance in correspondence to the charging condition of said main capacitor and is connected in parallel with said load, said circuit being provided between the main capacitor and an exposure meter circuit of a camera.

9 Claims, 3 Drawing Figures

ELECTRONIC FLASH DEVICE

The present invention relates to an electronic flash device used in flash photographying, etc. of a camera, particularly to an electronic flash device in which such appropriate exposure value can be automatically determined as corresponding to the change in the amount of illumination of said device in an association with an exposure meter of a camera.

When flash photographying is done with an ordinary automatic exposure adjusting camera (E.E. camera), if a conventional electric flash device is used such appropriate diaphragm value as corresponding to photographying distance is calculated from the amount of exposure of said device, that is, guide number, and said value needs to be set a diaphragm setting ring of a camera. Also even when a camera having flash auto mechanism in which the distance and the diaphragm are associated together as shown in U.S. Pat. No. 3,025,776 (Kodak) and Germany Pat. No. 1,175,069 (Kodak is used, the guide number of the electric flash device used together with said camera is set at a guide number setting ring of a camera as predetermined value, therefore sometimes such failure as insufficient exposure, etc. takes place for variation in the guide number in the electric flash device.

For eliminating this shortcoming various methods have been heretofore proposed. For example, a method to stop charging of a main capacitor of an electronic flash device when the level of charging of the main capacitor reaches a prescribed level to secure same guide number always, and a method to provide a bleeder circuit in parallel with a main capacitor of an electronic flash device for detecting the level of charging at the main capacitor, as disclosed already by the applicant of this invention in U.S. Pat. application Ser. No. 46,732, June 16, 1970, and in Germany application No. P 20 30 245.8, June 19, 1970, for receiving the output of said bleeder circuit by the base of a transistor provided within a diaphragm control circuit thus obtaining appropriate diaphragm value by the variation in the output resistance of said transistor, etc. have been proposed.

However, when so called high sensitivity exposure meter which functions by very small voltage is used, with the latter method, the range of variation of the charging voltage in the main capacitor for the electronic flash device is big, therefore it is difficult to introduce said variation precisely into the exposure meter.

The purpose of the present invention is to eliminate the above mentioned shortcoming, that is, to provide such electronic flash device that the variation in the charging level in the main capacitor for the electronic flash device is compressed and is introduced into an exposure meter circuit.

Now, the present invention shall be explained referring to drawings.

FIG. 1 is a circuit connection diagram showing an example of an electronic flash device according to the present invention, wherein the portion left to the chain line in the drawing shows an electronic flash device EF while the portion right to said chain line shows exposure meter circuit C of a camera.

Figure 3:
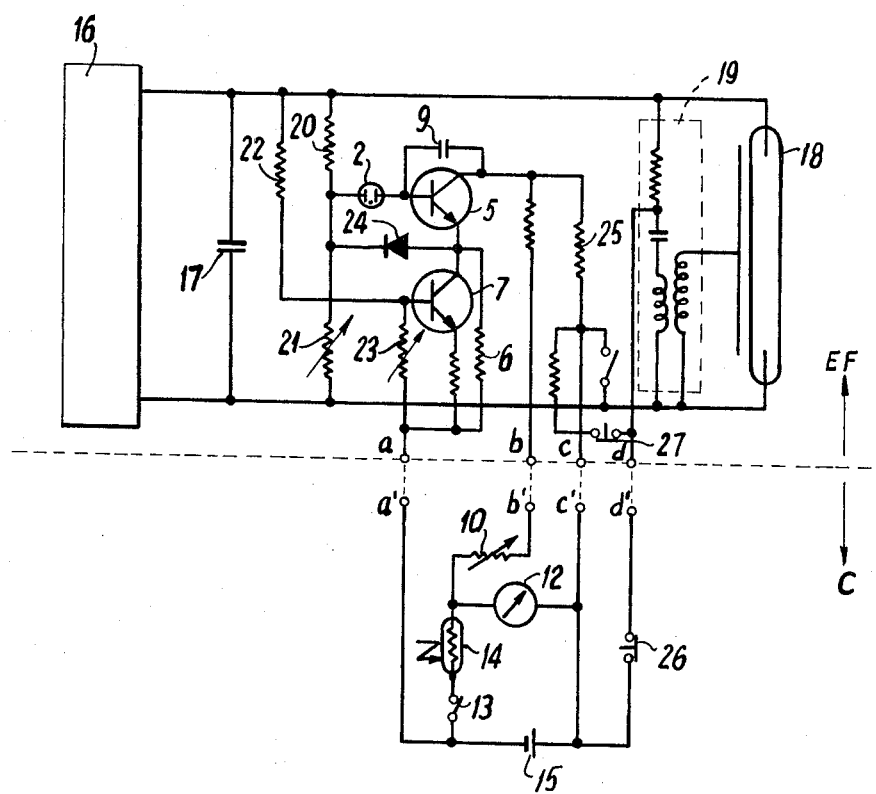

In the drawing 1 is a main part of the electronic flash device, consisting of a power source device, a main capacitor, a flash discharge tube, a trigger circuit, etc., as will be shown in FIG. 3. 2 is a neon lamp, 3 and 4 are bleeder resistance, and these parts are provided in parallel with the main capacitor and constituting a terminal voltage detecting circuit of the main capacitor. 5 is a switching transistor, which is connected at its base with a point A of the above mentioned detecting circuit and is connected through when the neon lamp 2 is lighted. 6 is a collector resistance of the transistor 5, and 7 is a control transistor provided in parallel with said collector resistance 6, and is connected to a point B of the above mentioned detecting circuit with its base. 8 is a variable resistance to adjust the action of the transistor 7. 9 is a feed back capacitor provided between the collector and the base of the transistor 5. The parts shown as $a$ and $b$ in the drawing are terminals to connect the electronic flash device and the exposure meter circuit of a camera, and are provided for example at an accessory shoe of a camera. Next, the exposure meter circuit of a camera shown here is of a flash auto system, wherein 10 is a variable resistance being associated with a distance ring, 11 is a resistance employing such resistance value as being sufficiently low compared to the resistance value of the parts 10, 12 which are connected in parallel therewith. 12 is an ammeter, 13 is a switch being activated by an auto-flash change over ring, etc. of a camera. 14 is a photo-conductive element to receive light from an object. 15 is a power source battery.

Next, the function of the device of this device shall be explained.

When an electronic flash device is connected to a camera and the power source switch of the electronic flash device is closed, the charging of the main capacitor is started and its terminal voltage will gradually goes up. When said voltage reaches such level as able to flash the flash discharge tube, the neon lamp 2 of the detecting circuit is lighted. Such voltage as proportional to the terminal voltage of the main capacitor is generated at the terminals A, B of the resistances 3 and 4 of the bleeder circuit (voltage dividing circuit) from the current flowing through the neon lamp 2.

Said voltage $V_A$ and $V_B$ will be given to the bases of the transistors 5 and 7, respectively, and the transistor 5 will be connected through by $V_A$.

Figure 2:
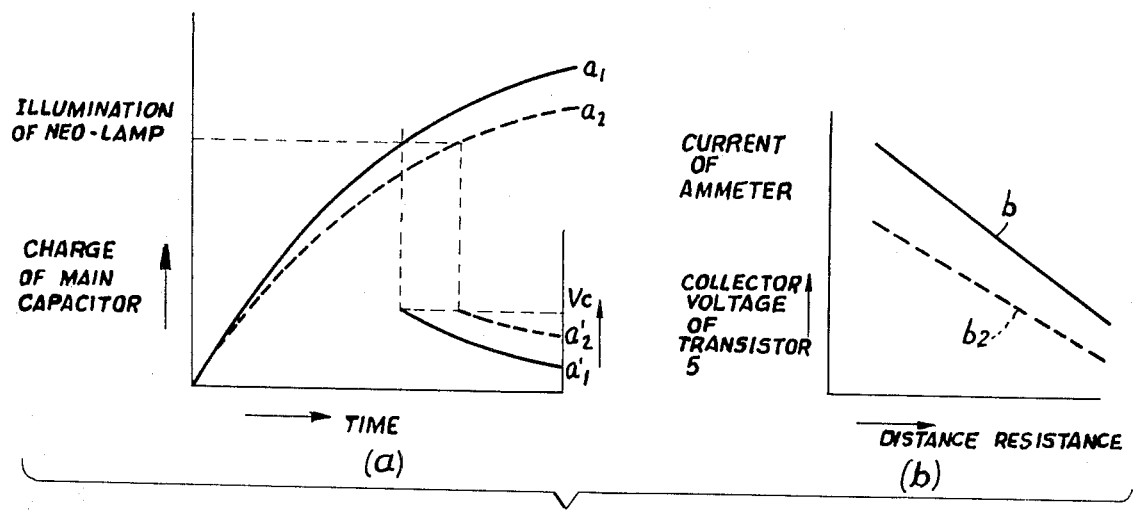

On the other hand the output resistance of the transistor 7 is varied by the variation of $V_B$. That is, a series circuit of the output circuit of the resistance 6 and the transistor 7 and the variable resistance 8 are inserted in parallel with the emitter of the transistor 5, and the voltage ($V_C$) of a point C of the emitter circuit of the transistor 5 is determined by the resistance value synthesized from these parts. Therefore, as shown in the table of FIG. 2$a$, as the charging level $A_1$ of the main capacitor reaches the such electric potential as lighting the neon lamp 2, the transistor 5 will be placed in "on" state. The pointer of the meter 12 swings as the transistor 5 is placed in "on" state, then the photographer can detect that the electronic flash device is now ready to be flashed from said swing of the pointer of the meter. As the charging level of the main capacitor increases, the electric potential $V_B$ of the point B goes up and the output resistance of the transistor 7 comes down, therefore, the electric potential $V_C$ of the point C will come down as shown in $A_1'$ of FIG. 2. The variation in the electric potential of $V_f$ is indicated as the variation in the diaphragm value by the meter 12. Therefore the photographer can set the diaphragm value indicated in the meter 12 on the camera to conduct flash photographing. While the feedback capacitor 9 is connected between collector and base of the transistor 5, this capacitor 9 performs such function as restraining the swing (generated at the time of switch on) of the meter of the exposure meter circuit. The chain lines $a^2$, $a'_2$ in FIG. 2 show the case when the power source is exhausted, and in this case same function as mentioned above will be performed.

Next, temperature compensation in the device shown in FIG. 1 shall be explained. When germanium transistor is used in the transistor 7, the above mentioned synthesized resistance value will vary by temperature through the temperature characteristics of the transistor 7.

That is, when said temperature is lower than normal temperature, the output resistance value of the transistor 7 becomes high, thus the synthesized resistance value becomes high. This variation through temperature characteristic of the transistor 7 can be selected at an appropriate value by suitably adjusting the variable resistance 8.

That is, in FIG. 2b, the resistance value of the variable resistance 10 which is associated with the distance ring is shown in ordinate and electric current flowing through the ammeter is shown in abscissa to show the variation in case of normal temperature $b_1$ and in case of low temperature $b_2$. When germanium transistor is used in the transistor 7, as temperature becomes low, leakage current is reduced and emitter resistance increases, therefore, when such circuit as shown in FIG. 1 is used the current flowing through the ammeter is reduced as shown by chain line $b_2$ at the time of low temperature and the curve shifts to lower position as shown in the drawing. The amount of this shifting can be suitably selected by adjusting the resistances 8, 6.

Next in camera side, the resistance 11 being connected in parallel with the series circuit of the variable resistance 10 associated with the ammeter 12 and the distance ring is to flow electric current from the power source battery 15 at camera side to the transistor 5 of the control circuit, and its resistance value is selected at such value as being sufficiently low against the sum of the resistance 10 and the internal resistance of the ammeter (for example a fraction of such number ranging from 2 to 19). By this the swing of the ammeter is reduced against the variation in the output current of the transistor 5 thus the ammeter circuit corresponds linearly against the wide range of variation in the guide number.

As has been explained above, the present invention is characterized by that the shunt resistance 6 and the transistor 7 are used for reducing the range of variation in the charging voltage of the main capacitor and introducing the same into the meter 12, and further, the switching transistor 5 is provided between the shunt resistance 6 and the meter 12 for having the pointer of the meter 12 swing as the electronic flash device becomes ready to flash.

Next, second example shown in FIG. 3 shall be explained.

While in the first example shown in FIG. 1 the variation in the current of the neon lamp 2 circuit is used for control of the transistors 5, 6, respectively, indication is a of appropriate diaphragm value apt to become inaccurate by effect of variation in the discharging characteristics of the lamp, etc. The second example is to provide improvement for the above, wherein 16 is a power source, 17 is a main capacitor, 18 is a discharge tube, 19 is a trigger circuit, 20, 21 are resistances constituting a first bleeder circuit (voltage dividing circuit), and 22, 23 are resistances constituting a second bleeder circuit (voltage dividing circuit). 24 is a diode, 25 is a resistance provided at output side of the transistor 5. 26 is synchronizing contact.

Next function of this example shall be explained. In the drawing, when the switch (not shown in the drawing) of the power source 16 of the electronic flash device is put in "on" state, the charging of the main capacitor 17 is started and its terminal voltage gradually goes up. As said voltage reaches such level as enabling the flash discharge tube 18 to flash, the neon lamp 2 of the terminal voltage detecting circuit is lighted. At this time the voltage to light said lamp can be suitably selected by adjusting the variable resistance 21 of the bleeder circuit (voltage dividing circuit). As the neon lamp 2 is lighted, voltage is given to the base of the transistor 5, thus the transistor 5 is placed in "on" state. By this voltage is generated at both ends of the resistance 25 of the output circuit, and is given to the exposure meter circuit of a camera through terminals $c$, $c'$. The emitter circuit of the transistor 5 is connected to the collector of the transistor 7, and the terminal voltage of the main capacitor 17 which has been divided by the bleeder circuits (voltage dividing circuits) 22, 23 is given to the base of the transistor 7.

Therefore, the output resistance value (between collector and emitter) of the transistor 7 becomes such value as corresponding to the terminal voltage of the main capacitor, thus the output of the transistor 5 is controlled by the transistor 7, and such output voltage as corresponding to the terminal voltage of the main capacitor 17 will be generated at both ends of the resistance 25. Therefore, the ammeter 12 of the exposure meter circuit swings corresponding to the distance information provided at the variable resistance 10 being associated with the distance setting ring, thus appropriate exposure value (diaphragm value) will be indicated in the ammeter by the guide number which has been introduced from the electronic flash device EF side and said distance information. As the synchronizing contact 26 is placed in "on" state and the flash discharge tube 18 is triggered in this state, flash photographing is performed. The diode 24 constitutes a discharging path to prevent lighting of neon lamp by the electric charge of the capacitor of the trigger circuit 19 flowing into the control circuit in a state wherein the power source switch of the electronic flash device is in "off" state.

The switch 27 is placed in "off" state as an electronic flash device is inserted into an accessory shoe of a camera and is automatically placed in "on" state as the electronic flash device is taken out of the shoe to discharge the electric charge of the capacitor of the trigger circuit 19, thereby preventing electric shock.

In this second example it is advantageous that the bleeder circuit (voltage dividing circuit) for the switching transistor 5 and the bleeder circuit (voltage dividing circuit) for the control transistor 7 are separately provided thus the effect of the neon lamp 2 will not be given to the control transistor 7.

What is claimed

1. An electronic flash device comprising a circuit having a first semi-conductor which functions switching action in correspondence to the charging condition of a main capacitor storing flash energy, a load connected to an emitter of said semi-conductor, and a second semi-conductor which varies output resistance in correspondence to the charging condition of said main capacitor and is connected in parallel with said load, said circuit being provided between the main capacitor and an exposure meter circuit of a camera.

2. An electronic flash device according to claim 1, in which the main capacitor is connected with a detecting circuit for detecting the charging condition of the main capacitor, said detecting circuit being connected with the first and second semi-conductors.

3. An electronic flash device according to claim 2, in which the detecting circuit is a bleeder circuit connected in parallel with the main capacitor.

4. An electronic flash device according to claim 2, in which the detecting circuit is composed of two bleeder circuits, each being connected with the first and second semi-conductors.

5. An electronic flash device according to claim 2, in which the first semi-conductor is a NPN transistor the base of which is connected with the detecting circuit.

6. An electronic flash device according to claim 5 in which a conductor is connected between the collector and the base of the transistor.

7. An electonic flash device according to claim 2 in which the second semi-conductor is an NPN transistor the base of which is connected to the detecting circuit.

8. An electronic flash device according to claim 7 in which the transistor is a germanium transistor.

9. An electronic flash device according to claim 8 in which the collector of the transistor is connected with a variable resistor.

* * * * *